Patented July 30, 1929.

1,722,904

UNITED STATES PATENT OFFICE.

IAN C. SOMERVILLE, OF CHELTENHAM, PENNSYLVANIA, ASSIGNOR TO ROHM & HAAS COMPANY, A CORPORATION OF DELAWARE.

CONDENSED AROMATIC SULPHONIC ACIDS AND PROCESS OF MAKING SAME.

No Drawing. Application filed January 18, 1928. Serial No. 247,748.

This invention relates to new materials which have the power of converting raw pelt into leather and which also have a natural affinity for water, oil and certain dyestuffs.

These new materials consist of condensed sulphonic acids of aromatic hydrocarbons which are substituted in the nucleus with aliphatic or aromatic radicals. They may be obtained by sulphonating an aromatic hydrocarbon and condensing the sulphonic acid with an aliphatic or aromatic alcohol to produce an alkyl or aryl or aralkyl substituted aromatic sulphonic acid which is then condensed with formaldehyde. The agents for carrying out the reactions, or the sequence of the steps may be varied.

I have found that an important step is the condensation with formaldehyde as without this step less efficient tanning materials are obtained. The efficiency of the tanning materials obtained increases as the amount of formaldehyde used in their preparation is increased.

These new preparations also possess other qualities such as simultaneous affinity for oils and water which renders them useful as emulsifying agents or as wetting agents, or as spray dyeing agents, or as fat-liquoring agents. These properties make them useful in other fields than the leather industry as for instance in wetting of animal or vegetable fibres in the textile industry.

It is known that naphthalene sulphonic acid can be condensed with formaldehyde to form a tanning material. The use of methyl naphthalene sulphonic acid in place of naphthalene sulphonic acid has also been described. I have, however, discovered that a new characteristic is introduced when the radical substituted in the naphthalene is so chosen that the carbon atom linked to the naphthalene nucleus is further linked to two, but not more than two other carbon atoms and the fourth linkage is to hydrogen.

The new characteristic is the ability of the condensed sulphonic acid to lower the surface tension at the interface between oil or grease and water, when as little as one percent of the condensed acid is dissolved in the water. This property is only conferred upon a condensed naphthalene sulphonic acid when the naphthalene is substituted in the particular way mentioned above and the simplest substituted radical which produces this result is isopropyl—

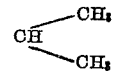

These new preparations also possess an affinity for dyestuffs which contain basic groups which makes them useful as mordants for basic dyestuffs.

The invention is illustrated by the following examples but the invention is not confined to these examples.

*Example.*

128 grs. of naphthalene
150 grs. of sulfuric acid 66° Bé.

are heated together at 160° C. for 2 hours. The temperature is then lowered to 120° C. and a mixture of 128 grs. of isopropyl alcohol
88 grs. of sulfuric acid, 66° Bé.

is slowly run in over a period of 1½ to 2 hours and the temperature held at 120° for a further period of three hours, when the temperature is lowered to 90° C.

40 grs. of formaldehyde 37% are then added, over a period of 30 minutes while the temperature is held at 90° C. and this temperature is held for a further period of 4 to 5 hours or until the smell of formaldehyde has disappeared.

The resulting product is then neutralized with lime and filtered. The filtrate is then acidified with sulfuric acid to free the new material from its lime salt and the calcium sulphate formed is filtered off. Or instead of neutralizing completely the calculated necessary amount of lime may be added to neutralize the free sulfuric acid.

The use of other condensing agents is also possible, for instance, the use of chlorosulphonic acid in place of sulfuric acid for sulphonation of naphthalene and introducing the isopropyl group into the naphthalene nucleus or again the use of aluminum chloride for the introduction of alkyl or aryl or aralkyl groups into the aromatic hydrocarbon nucleus.

Having now illustrated how my invention may be carried into effect I claim—

1. As new compositions of matter the formaldehyde condensation products of substituted naphthalene sulphonic acids where the carbon atom of the substituting radical linked to the naphthalene nucleus is also linked to two but not more than two carbon atoms and the fourth valency saturated by hydrogen.

2. As new compositions of matter the formaldehyde condensation products of substituted naphthalene sulphonic acids wherein the substitution is effected by condensing a secondary monohydroxyl aliphatic alcohol with the naphthalene nucleus in such a manner as to eliminate water between the hydroxyl group of the alcohol and a hydrogen atom attached to the naphthalene nucleus.

3. As a new composition of matter the formaldehyde condensation product of isopropyl naphthalene sulphonic acid.

In testimony whereof I have hereunto set my hand.

IAN C. SOMERVILLE.